May 19, 1964  L. HANER ET AL  3,134,076
FREQUENCY CONTROL SYSTEM
Filed Nov. 21, 1961  5 Sheets-Sheet 1
3 - PHASE WAVEFORM RELATIONSHIP
PHASE A
PHASE B
PHASE C
A·C
A·B
B·C
TIME →
0    $\frac{1}{2f}$    $\frac{1}{f}$    $\frac{3}{2f}$    $\frac{2}{f}$
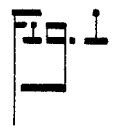
Fig. 1
*INVENTORS*
Lambert Haner
BY Herbert R. Ryerson
Their Attorney $$e_o = \frac{1}{RC}\int_0^t e_i\, dt$$

INVENTORS
Lambert Haner
BY Herbert R. Ryerson

Their Attorney

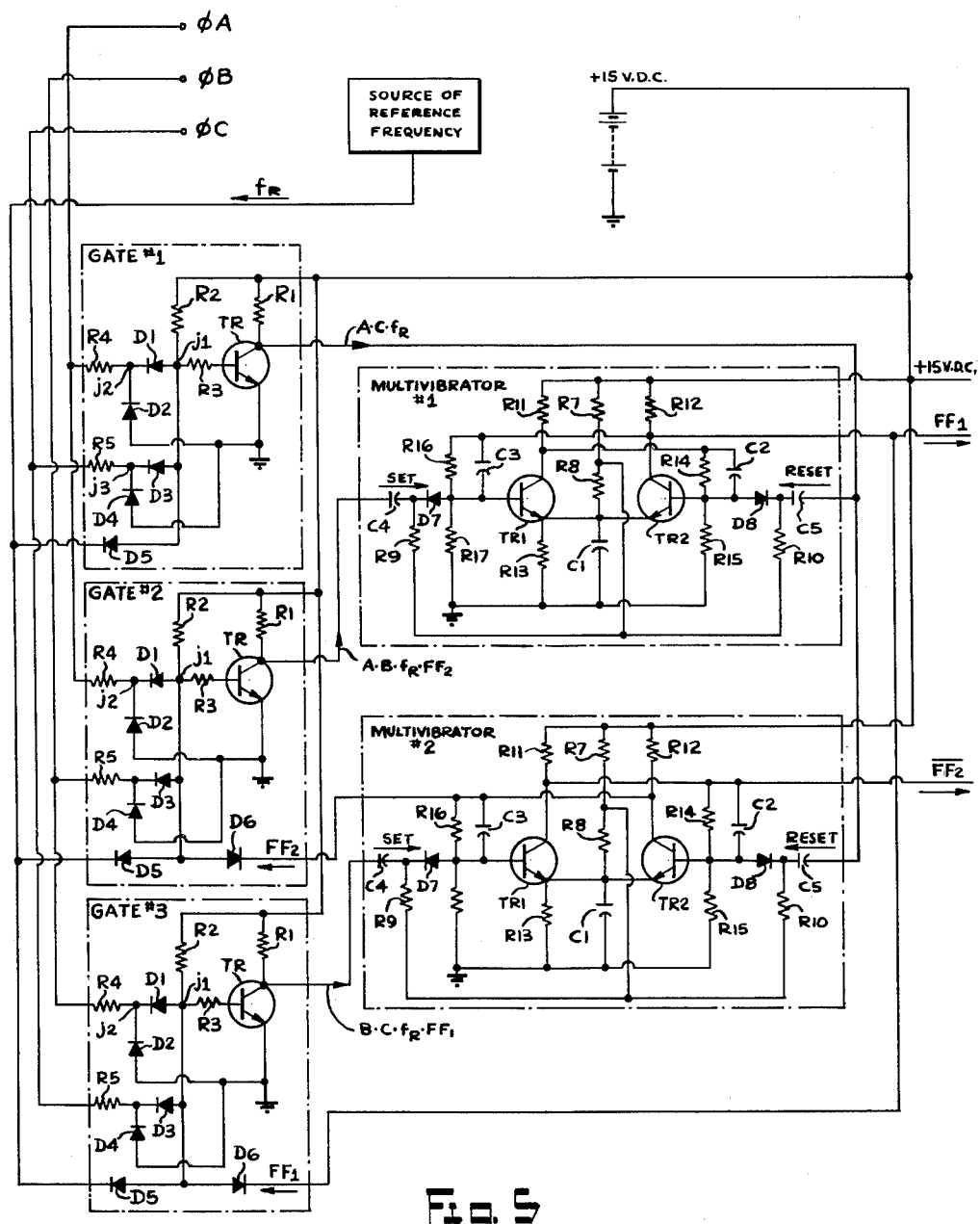

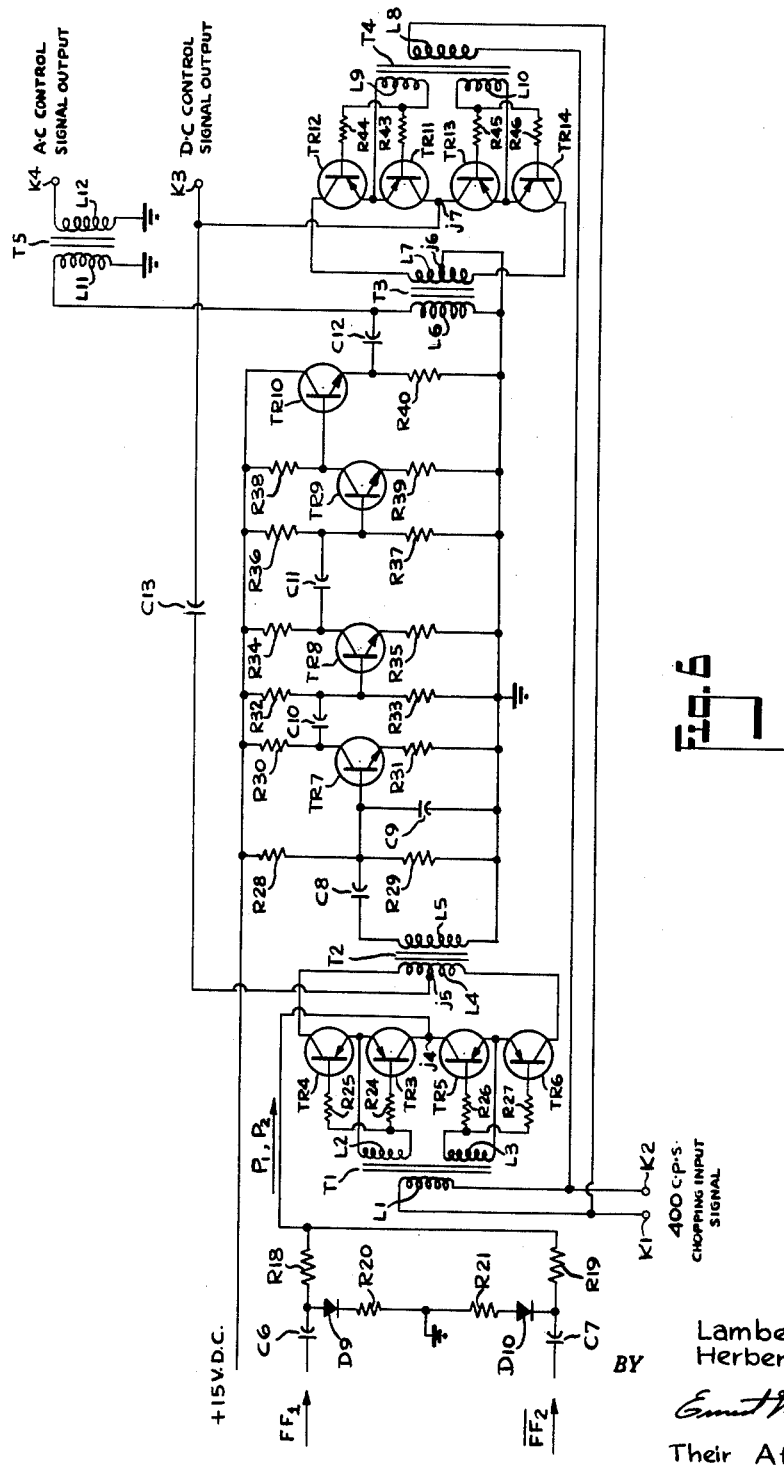

United States Patent Office 3,134,076
Patented May 19, 1964

3,134,076
FREQUENCY CONTROL SYSTEM
Lambert Haner, Rocky River, and Herbert R. Ryerson, Garfield Heights, Ohio, assignors to Avtron Manufacturing, Inc., a corporation of Ohio
Filed Nov. 21, 1961, Ser. No. 153,976
11 Claims. (Cl. 328—133)

This invention relates in general to frequency control systems, and more particularly to a frequency difference detector and integrator circuit which provides an output signal corresponding in polarity and magnitude to the direction and extent of departure of one frequency from another. Ordinarily one frequency is that which is to be regulated, and the other frequency is a reference frequency.

The circuit of the invention is intended primarily for use in conjunction with self-contained alternating current electrical systems. An example of such a system is a 400 cycle 3 phase alternator set suitable for aircraft and vehicular applications. Proper functioning of the equipment served by the electrical supply necessitates accurate frequency control. Up to the present, the control function has usually been achieved by an electro-mechanical system comprising a pair of synchronous A.-C. motors, a mechanical differential, a synchro transmitter and associated drive amplifiers. One synchronous motor is driven by the frequency to be controlled, the other by the reference frequency; the mechanical differential responds to the difference in speed of the two motors and, through the synchro transmitter, provides a signal which is amplified by the drive amplifiers and used to control the prime mover which drives the alternator set, or a variable speed transmission interconnecting the prime mover and the alternator.

The general object of the invention is to provide an all electrical system, that is one using only static or non-rotating electrical components to perform operationally the same frequency control function as the prior electro-mechanical systems. By so doing, it is proposed to achieve a more precise control system requiring negligible maintenance.

A more specific object of the invention is to provide a frequency control system which is light in weight and reliable in operation, and to this end, a system using exclusively solid state or semi-conductor control devices is proposed.

In accordance with the invention, the frequency difference between the A.-C. voltage to be controlled and a reference frequency signal occurring in the form of a series of pulses is detected by a frequency difference detector comprised of digital type circuits. The detector delivers an output signal every time there occurs a complete 360° change in phase between the controlled frequency and the reference frequency. The output signal or pulse has one polarity when the phase change is one direction, and the reverse polarity when the phase change is in the opposite direction. In other words, for a positively frequency difference between the controlled frequency and the reference frequency, the signals are of one polarity and occur at every 360° phase change. For a negative frequency difference, the signals are of reverse polarity and likewise occur at every 360° phase change. Consequently, the frequency difference detector determines frequency difference based on total phase accumulation and also indicates the direction of the frequency difference. The frequency difference detector supplies the signals or pulse information to an electronic integrator which integrates the pulses to generate the required time constant, and converts the digital error information into a continuous analog type electrical control signal suitable for operating a controller on the prime mover or on the transmission coupling prime mover to alternator.

In a preferred embodiment designed for a three phase A.-C. system, the frequency difference detector circuit comprises three diode gating circuits forming "AND" logic gates and two transistorized bistable multivibrators of flip-flops. The three phases of the A.-C. voltage to be controlled may be designated A, B, and C. The first gate is supplied with phase A, phase C and the reference frequency as inputs, and provides an output only when all three are simultaneously positive. The output of the first gate is fed to both multivibrators; if either multivibrator had previously been upset from its first stable state and set to its second stable state, it is thereby reset to the first; otherwise, the multivibrator merely remains in its first stable state. The second gate is supplied with phase A, phase B, the reference frequency, and also a blocking signal from the second multivibrator when it is in its second state, and feeds its output to the first multivibrator to upset it to its second state. The third gate is supplied with phase B, phase C, the reference frequency, and also a blocking signal from the first multivibrator when it is in its second state, and feeds its output to the second multivibrator to upset it to its second state. If the controlled frequency is higher than the reference frequency, the second gate wil have an output next after the first gate and the first multivibrator will be upset. When the first multivibrator is upset, it provides a positive signal to the integrator and simultaneously blocks the third gate so that the second multivibrator cannot be upset. However, if the controlled frequency is lower than the reference frequency, the third gate will have an output next after the first gate and the second multivibrator will be upset. When the second multivibrator is upset, it provides a negative signal to the integrator and simultaneously blocks the second gate so that the first multivibrator cannot be upset. Thus, when the controlled frequency is higher, the integrator cumulates a positive signal at each 360° phase change; when the controlled frequency is lower, the integrator cumulates a negative signal. If the controlled frequency and the reference frequency coincide, the two multivibrators remain in whatever stable state they happen to be in and the integrator does not receive any signals of either polarity; the output control signal of the integrator in such case remains at a constant level.

In the preferred embodiment, the signal provided by the first multivibrator whenever it cycles is a negative step. That provided by the second multivibrator is a positive step. These signals are supplied to a differentiating circuit which translates them respectively into negative or positive constant area pulses. An integrating circuit utilizing a high gain amplifier with capacitive feedback then integrates these constant area pulses to provide a continuous analog type control signals whose polarity and amplitude will be determined by the direction and extent of frequency departure of the controlled frequency relative to the reference frequency.

Additional features and advantages of the invention will appear from the detailed description to follow of a preferred embodiment and the accompanying drawings illustrating same. The features of the invention believed to be novel will be more particularly pointed out in the appended claims.

In the drawngs:

FIG. 1 illustrates phase relationships pertinent to the frequency control system of the invention.

FIG. 5 is a schematic circuit diagram of the frequency difference detector of the system.

FIG. 6 is a schematic circuit diagram of the differentiating and integrating circuit.

Referring to FIG. 1, the phase relationships between the three phase voltages A, B, and C of a three phase system are represented to a common time base. The output of an alternator set is actually sinusoidal but the waveforms have been depicted as square because this is effectively the waveform transformation that takes place in the frequency detector. It will be appreciated that the time interval 0 to $1/f$ represents one complete electrical cycle of 360°, and in the case of a 400 cycle system, corresponds to $1/400$ second. The relationships indicated by A·C, A·B, and B·C are correlated control functions corresponding to the requirement, in the case of A·C, that both $\phi A$ and $\phi C$, the voltages of phases A and C, be simultaneously positive; in the case of A·B, that $\phi A$ and $\phi B$ be simultaneously positive; and in the case of B·C, that $\phi B$ and $\phi C$ be simultaneously positive. In a theoretically perfect system, the functions A·C, A·B, and B·C provide rectangular waves of 60 electrical degrees ($1/6f$ time-duration), recurring at 360° intervals. The resulting gap of 60° between proximate waves assures that there is no overlap in time.

Figure 3:
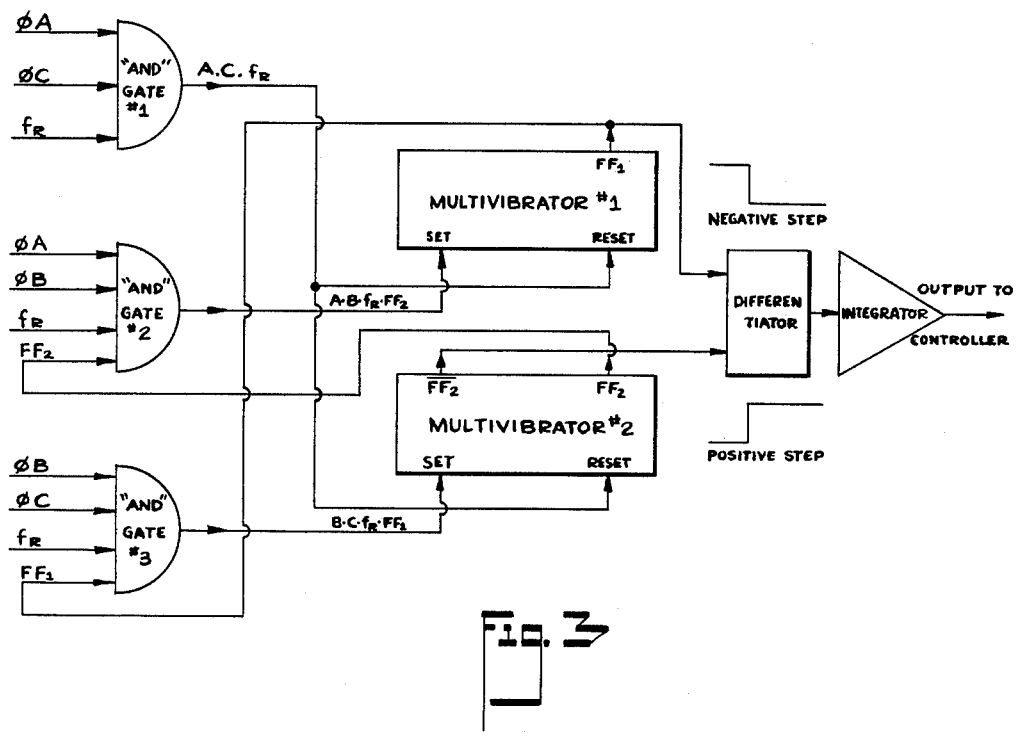
FIG. 3 is a block diagram with suitable headings of a frequency control system embodying the invention.

The general scheme or organization of the control system in a preferred embodiment of the invention is laid out in block form in FIG. 3 following generally conventional logic notation. The frequency difference detector section comprises the three "AND" gates #1, #2 and #3, and the two multivibrators #1 and #2. FIG. 5 is a schematic diagram of the frequency difference detector section and the corresponding functional groups have been enclosed in dot-dash line rectangles appropriately labeled. Since all three gates are essentially similar and both multivibrators are identical, only one of each will be described in detail and like reference characters are used to identify corresponding elements or parts throughout.

Referring to FIG. 5, each gate comprises a transistor designated TR. According to the conventional representation utilized, the base is indicated by the straight line, and emitter and collector by the angled lines, that bearing the arrowhead being the emitter. The arrow indicates the direction of current flow, opposite to electron flow. The illustrated embodiment utilizes NPN transistors but PNP transistors could equally well be used with reversal of polarity. The emitter of the transistor is grounded and the collector is connected in series with a loading resistor R1 to the positive side of a direct current source indicated by a battery, suitably 15 volts D.-C. The base of the transistor is connected, in series with current limiting resistors R2 and R3, to the positive side. In the case of gate #1, the phase A voltage $\phi A$ is supplied to the junction point $j1$ of resistors R2 and R3 through resistor R4 and diode D1 which is poled to permit current flow from the junction only. Diode D2 provides a negative clamp to ground for junction $j2$ of R4 and D1, that is, it is poled to permit current flow which will prevent this junction from being driven negative with respect to ground. Similarly, phase voltage $\phi C$ is supplied to junction $j1$ through resistor R5 and diode D3 whose junction $j3$ is provided with a negative clamp to ground through diode D4. The source of reference frequency pulses $f_R$ is connected to junction point $j1$ directly through diode D5 which, like diodes D1 and D3, is poled to permit current flow from the junction towards the source only.

The operation of gate circuit #1 is as follows. Normally the transistor is cut off or conducts minimum current only. This is so on account of the bias or voltage imposed on the base when any one of the three inputs $\phi A$, $\phi C$ or $f_R$ is not positive. Assume for instance a given instant at which $\phi A$ is negative or zero, or in any event less positive than the potential which would otherwise exist at $j1$. Then current flow through R3, from the positive supply through R2, is effectively shunted through D1, R4 and the internal impedance of the source of $\phi A$. If $\phi A$ is negative, current will flow through D2 to hold $j2$ at ground and prevent an excessively high negative potential from being applied to the base of the transistor and possibly damaging it, but the result is the same. Similarly, unless $\phi C$ is positive, current through R3 will be shunted through D3. Likewise, at all times except when a pulse is occurring, current through R3 will be shunted through D5 and the internal impedance of the source of $f_R$. Under any of these conditions, the residual current through R3 and the base of the transistor is insufficient to turn the transistor on. However, at the instant when all three inputs $\phi A$, $\phi C$ and $f_R$ are positive, current flows through the base-emitter circuit and turns on the transistor with the resultant heavy current flow through the collector-emitter circuit. This results in a negative pulse corresponding to $f_R$ being produced at the junction of the collector and R1. The operation of gate #1 may therefore be described as to transmit $f_R$ whenever there is coincidence with the function A·C; the resulting function may be summarized by the notation A·C·$f_R$ and is so indicated in the functional relationships depicted in FIG. 2.

The operation of gate circuit #2 is basically the same as that of gate circuit #1, but since the input phase voltages are $\phi A$ and $\phi B$, the response is to the function A·B, in coincidence with $f_R$. However in the case of gate #2, junction $j1$ is supplied through diode D6 with a fourth input signal coming from multivibrator #2 and designated $FF_2$. Therefore the operation of gate #2 may be described as to transmit $f_R$ whenever there is positive coincidence with the function A·B·$FF_2$; the resulting function may be summarized by the notation A·B·$f_R$·$FF_2$ and is so indicated in the functional relationships depicted in FIG. 2.

Figure 2:
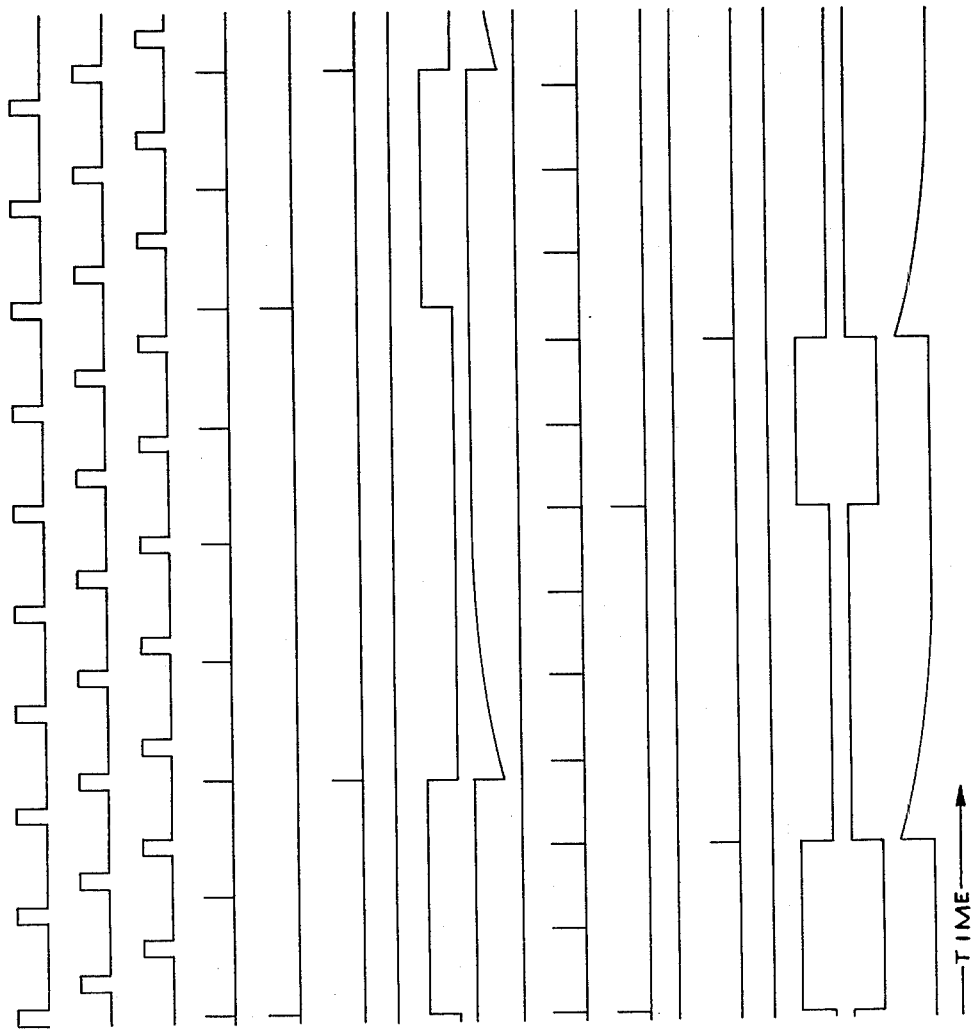
FIG. 2 illustrates time relationships of events or signals under different operating conditions in the control system.

The operation of gate circuit #3 is like that of gate circuit #2 but the input phase voltages are $\phi B$ and $\phi C$, and the fourth input signal supplied through diode D6 comes from multivibrator #1 and is designated $FF_1$. The operation is to transmit $f_R$ whenever there is positive coincidence with the function B·C·$FF_1$; the resulting function B·C·$f_R$·$FF_1$ is depicted in FIG. 2.

Multivibrators #1 and #2 are known forms of bistable multivibrators or flip-flops. Each comprises a pair of transistors TR1, TR2 having collector load resistors R11, R12, and common emitter load resistor R13 and capacitor C1. Cross coupling from collector to base is by resistor R14 and capacitor C2 with resistor R15 determining bias in the one case, and by resistor R16 and capacitor C3 with resistor R17 determining bias in the other case. Bias conditions are further determined or stabilized by the circuity including resistors R7 to R10 and diodes D7 and D8.

The multivibrator circuit has two stable states in which either one of the two transistors is conducting or on, and the other is non-conducting or off, either state continuing indefinitely until an external signal causes an upset. This results of course from base bias imposed by the cross coupling: the low collector voltage at the on transistor results in a reverse bias at the base of the off transistor, and at the same time, the high collector voltage at the off transistor results in a forward bias at the base of the on transistor. To upset the state of the multivibrator, a negative pulse is applied to the base of the on transistor; this causes the on transistor to go off, and of course the other transistor then becomes the on transistor. The negative pulse is applied to the base of transistor TR1 through capacitor C4 and diode D7, and to the base of transistor TR2, through capacitor C5 and diode D8. For convenience hereinafter, either multivibrator will be described as set when transistor TR1 is off, and as reset when transistor TR2 is off. To set either multivibrator, a negative pulse is applied to the base of TR1, and to reset it, a negative pulse is applied to the base of TR2. It will be appreciated that if a set impulse is applied to a multivibrator which is already set, there is no action or consequence; likewise there is no action if a reset impulse is applied to a multivibrator already reset. For a change of state to occur, a set impulse must be applied to a reset multivibrator or a reset impulse to a set multivibrator.

The interconnections of the three gates and of the two multivibrators in the frequency difference detector circuit are as follows, reference being had to FIGS. 3 and 5. Gate #1 supplies the function $A \cdot C \cdot f_R$ to both multivibrators #1 and #2 at their reset input terminals. Gate #2 supplies the function $A \cdot B \cdot f_R \cdot FF_2$ to the set input terminal of multivibrator #1 and receives as one of its input signals the function $FF_2$ from multivibrator #2. Gate #3 supplies the function $B \cdot C \cdot f_R \cdot FF_1$ to the set input terminal of multivibrator #2 and receives as one of its input signals the function $FF_1$ from multivibrator #1. The output signals ultimately utilized by the control system are the function $FF_1$ from multivibrator #1, and the function $\overline{FF_2}$, that is, the function $FF_2$ inverted, from multivibrator #2.

The operation of the frequency difference detector is as follows, reference being had to FIG. 2. If one assumes identity of frequency and coincidence of phase between functions $A \cdot C$ and $f_R$, only gate #1 will pass a signal. The reference frequency impulses $f_R$ will be continuously supplied to both multivibrators as reset impulses, and both multivibrators merely remain in the reset state. Under this condition, there is no action.

Assume now as case #1 that the controlled frequency drifts higher than the reference frequency. The phase control functions $A \cdot C$, $A \cdot B$ and $B \cdot C$ will now be advancing in phase relative to $f_R$ at a rate proportional to the difference in frequency. In FIG. 2, for ease of illustration, the case #1 situation is depicted by drawing the reference frequency impulses $f_R$ to a longer time base than the phase control functions.

As previously mentioned, initially $A \cdot C$ and $f_R$ were in phase and both multivibrators were reset. As time progresses, the phase relationship changes until eventually the $f_R$ pulses are in phase with $A \cdot B$, such occurring at the 3rd $f_R$ pulse in the drawing. Coincidence of the $f_R$ pulse with $A \cdot B$ must occur before coincidence with $B \cdot C$ because $A \cdot B$ lags $A \cdot C$ by 120° whereas $B \cdot C$ lags $A \cdot C$ by 240°. Up to this moment, both multivibrators were reset, that is having TR2 cut off, with the result that both gates #2 and #3 were being supplied with positive FF signals. Therefore gate #2 passes the $f_R$ pulse (being the function $A \cdot B \cdot f_R \cdot FF_2$) to the set input of multivibrator #1 and upsets it to the set state. The change of state results in a negative step voltage at the collector of TR2 which has been turned on. This negative step or $FF_1$ signal is used in two ways: (a) it is supplied to the differentiator which converts it into a negative constant area pulse $P_1$ and in turn supplies it to the integrator; (b) it is supplied to gate #3 and holds it blocked. Therefore gate #3 cannot pass any $f_R$ pulses until multivibrator #1 is reset with the result that multivibrator #2 cannot be upset in the meantime and there is no action at the moment when the $f_R$ pulse moves into phase with $B \cdot C$. Eventually $f_R$ will move into phase with $A \cdot C$ again, as seen at the 7th $f_R$ pulse in FIG. 2. Gate #1 will now transmit a negative $f_R$ pulse to the reset input of multivibrator #1 and cause it to revert to the reset state, at the same time ending the blocking of gate #3. This completes the detection of a gain in phase of one full cycle.

Assume as case #2 that the controlled frequency drifts lower than the reference frequency. The phase control functions $A \cdot C$, $A \cdot B$ and $B \cdot C$ are now regressing or dropping back in phase relative to $f_R$. In FIG. 2, this case is depicted by drawing the reference frequency impulses $f_R$ to a shorter time base than the phase control functions.

Initially the $f_R$ pulses are in phase with $A \cdot C$ and pass through gate #1 so that both multivibrators are reset. As time progresses, the phase relationship changes until eventually the $f_R$ pulses occur in phase with $B \cdot C$, as seen at the 3rd $f_R$ pulse (Case 2) in FIG. 2. In this case coincidence of $f_R$ with $B \cdot C$ must occur before coincidence with $A \cdot B$ because $B \cdot C$ leads $A \cdot C$ by 120° whereas $A \cdot B$ leads $A \cdot C$ by 240°. Therefore gate #3 now passes the negative $f_r$ pulse (being the function $$B \cdot C \cdot f_R \cdot FF_1)$$

to the set input of multivibrator #2 and upsets it to the set state. In the change of state, TR1 is turned off resulting in a positive step voltage at its collector, and TR2 is turned on, resulting in a negative step voltage at its collector. The former is used as the $\overline{FF_2}$ or inverted $FF_2$ signal which is supplied to the differentiator, converted by it into a positive constant area pulse $P_2$, and supplied to the integrator. The latter is the $FF_2$ signal which is supplied to gate #2 to hold it blocked. Thus gate #2 is prevented from passing any $f_R$ pulses until multivibrator #2 is reset. Multivibrator #1 cannot be upset in the meantime, and there is no action when the $f_R$ pulses move into phase with $A \cdot B$. As seen in FIG. 2, $f_R$ moves into phase with $A \cdot C$ again at the 7th $f_R$ pulse, at which time gate #1 transmits a negative $f_R$ pulse to the reset input of multivibrator #2 and causes it to revert to the reset state. This ends the blocking of gate #2 and completes the detection of a loss in phase of one full cycle.

Summarizing the foregoing, the operation of the frequency difference detector is to provide a negative step voltage or square wave, indicated by $FF_1$ in FIG. 2, at every gain in phase of one full cycle by the controlled frequency over the reference frequency; or conversely, a positive step voltage or square wave, indicated by $\overline{FF_2}$, at every loss in phase of one full cycle by the controlled frequency relative to the reference frequency. The time duration of the voltage step is from coincidence of the $f_R$ pulse with the function $A \cdot B$ or $B \cdot C$ as the case may be, to coincidence with the function $A \cdot C$, that is, $\tfrac{2}{3}$ of the time duration of a complete cycle change. Thus the time duration of the voltage step is variable and depends upon the extent of frequency drift and is inversely proportional to the departure of the controlled frequency from the reference frequency. It will be appreciated that the frequency departures represented by case #1 and case #2, as depicted in FIG. 2, amount to about 15%, and that for smaller frequency departures, the durations of the step voltages will be much greater.

The function of the differentiator is to convert the variable time duration step voltages $FF_1$ or $\overline{FF_2}$ supplied by the frequency difference detector, into constant area pulses, that is, pulses of constant amplitude-time integral (voltage or current-time integral) with polarities corresponding to the step voltages. Thereafter, the integrator integrates the constant area pulses or signals to provide a control signal output which is proportional to the total phase deviation.

The schematic diagram of FIG. 6 comprises both the differentiating and integrating circuits. The negative step voltage $FF_1$ is supplied through capacitor C6 and resistor R18 to input terminal j4. The time constant of the circuit is such as to produce the current waveform depicted by $P_1$ in FIG. 2 at the initiation of the negative step of $FF_1$. At the termination of the negative step, the charging current through C6 is effectively short-circuited to ground through diode D9 and is not transmitted to the integrator. In the event of a positive step voltage $\overline{FF_2}$ it is supplied through capacitor C7 and resistor R19 to input terminal j4 and produces the current waveform depicted by $P_2$ in FIG. 2 at the initiation of the positive step. At the termination of the positive step, the charging current is short-circuited to ground through diode D10. Resistors R20 and R21 have low values and protect the diodes from excessive inrush current. Thus for each full cycle gained or lost by the controlled frequency relative to the reference frequency, there is provided at terminal j4 either a negative or a positive constant area pulse or signal.

Figure 4:
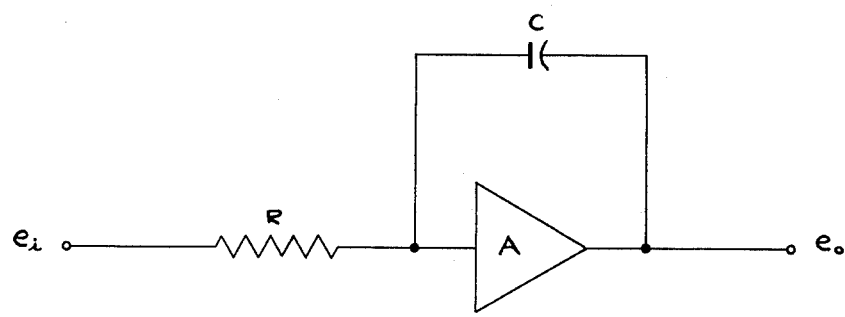
FIG. 4 is an analytic diagram of the integrator circuit.

To integrate the constant area pulses, a Miller integrator type circuit is provided whereof the mode of operation is as follows, reference being had to FIG. 4. If an input signal $e_i$ is supplied through a resistance R to the input of an amplifier A providing an output signal $e_0$ and having feedback from output to input through a capacitor C, and the gain of the amplifier is very large, then $$e_0 = \frac{1}{RC}\int_0^t e_i dt$$

The foregoing may be explained qualitatively by observing that if the gain of the amplifier is assumed to be infinite, then the current which the rate of change of the output voltage causes the capacitor to feed back to the input, must be equal to the current which is supplied by the input signal through the input resistance. Since the rate of change of the output is proportional to the input, it follows that the output is proportional to the time integral of the input.

Referring to FIG. 6, the desired integrating function could be performed by supplying the constant area pulses at terminal j4 to a high gain D.-C. amplifier with capacitive feedback. However D.-C. amplifiers are subject to drift and are difficult to maintain in adjustment. The scheme which has been adopted in the preferred embodiment illustrated in FIG. 6 is to utilize a high gain A.-C. amplifier with synchronized 400 cycle choppers at both the input and the output of the amplifier. The input chopper converts the constant area pulses into corresponding 400 c.p.s. signals; these are translated through the A.-C. amplifier, and then reconverted back into the original form by the output chopper.

The input chopper comprises transistors TR3 and TR4 in one branch, and TR5 and TR6 in the other branch. The transistors are bilaterally conducting and the two branches are turned alternately on and off at a 400 c.p.s. rate. The 400 c.p.s. chopping signal is supplied at terminals K1 and K2 to the primary L1 of transformer T1 and coupled by secondaries L2 and L3 to the bases of transistors TR3, TR4, and TR5, TR6 respectively. Resistors R24 to R27 perform the usual function of limiting base current. The emitter-collector circuits in the two branches are connected to opposite sides of the primary L4 of transformer T2 whose midpoint j5 is the application point for the D.C. feedback through capacitor C13 from the output chopper. When transistors TR3 and TR4 of the upper branch are turned on, the effect is to connect j4 to j5 through the upper half of winding L4; similarly, when transistors TR5 and TR6 are turned on, j4 is effectively connected to j5 through the lower half of winding L4. While a transistor chopper is preferred for reliability and freedom from maintenance, a mechanical chopper or switch could be used to accomplish the same function; in such case the switches in the input and output choppers would need to be mechanically interconnected to maintain synchronism.

The effect of switching the $P_1$ or $P_2$ signal at a 400 c.p.s. rate across the two halves of winding L4 is to develop across secondary winding L5 a corresponding 400 cycle square wave A.-C. signal. The A.-C. signal is coupled by capacitor C8 to the base of transistor TR7; from the collector of transistor TR7 by capacitor C10 to the base of transistor TR8; from the collector of transistor TR8 by capacitor C11 to the base of transistor TR9; and from the collector of transistor TR9 by direct connection to the base of transistor TR10. The three transistors TR7, TR8, and TR9 operate in conventional fashion as collector-to-base coupled amplifiers and the functions of the remaining circuit elements associated therewith are apparent upon inspection of the drawing. Transistor TR10 operates as an emitter-follower and its output signal developed across emitter resistor R40 is coupled by capacitor C12 to the primary L6 of transformer T3.

The secondary winding L7 of transformer T3 has its mid-point j6 grounded and is connected across the emitter-collector circuits of the output chopper comprising transistors TR11, TR12 in one branch and TR13, TR14 in the other branch. The output chopper is driven from the 400 c.p.s. supply through transformer T4 and associated circuitry in the same fashion as the input chopper. The effect of alternately turning on and off the two branches of the output chopper is to connect j7 to j6 alternately through the upper or the lower half of winding L7. Since the output chopper is synchronized with the input chopper, such action effectively reconstitutes the $P_1$ or $P_2$ signal into its original D.-C. form at point j7. Capacitor C13 provides capacitive feedback from point j7 to point j5 of the input chopper. Therefore the input and output choppers, together with the A.-C. amplifier and feedback capacitor C13, function as the operational amplifier previously discussed with reference to FIG. 6, and the output signal at terminal K3 (connected to junction point j7) is the time integral of the input $P_1$ or $P_2$ signal.

The output signal at terminal K3 will be a D.-C. type signal, rising or dropping according to whether negative $P_1$ constant area pulses, or positive $P_2$ constant area pulses, are being received. Within the limits of saturation of the amplifier, the increment per pulse will be constant and therefore the amplitude of the output control signal will be proportional to the total phase departure of the controlled frequency from the reference frequency. This control signal is supplied to a controller for the prime mover or for the variable speed transmission. In practice, of course, either the prime mover or the variable speed transmission between the prime mover and the alternator set will respond to the control signal and correct the controlled frequency before saturation of the amplifier sets in.

The output signal developed across emitter resistor R40 of transistor TR10 is also coupled by capacitor C12 to primary winding L11 of transformer T5 and appears at output terminal K4 of secondary winding L12. This output signal will likewise be the time-integral of the input $P_1$ or $P_2$ signal, but will be an A.-C. type signal modulated or chopper at a 400 c.p.s. rate. In other words, this output will be a 400 c.p.s. square wave whose amplitude will be proportional to the total phase departure of the controlled frequency from the reference frequency. The polarity or direction of departure in this case is given by the phase of the wave, that is, there is a 180° phase reversal in the wave when the phase departure of the controlled frequency relative to the reference frequency changes from positive to negative. For certain types of controllers, such an A.-C. signal is preferable to a D.-C. signal.

The system may readily be adapted to a single phase alternator by artificially creating the other two phases. It is not even necessary to have three signals at 120° intervals. It is only necessary to provide two signals, one advanced and the other retarded in phase relative to the single phase signal whose frequency is to be controlled. This is readily accomplished by a capacitance-resistance combination for the former, and an inductance-resistance combination for the latter. It will also be apparent that the system may be used to synchronize two alternators by treating the output of one as the reference frequency and the output of the other as the controlled frequency.

The preferred embodiment of the invention which has been illustrated and described is intended of course by way of example of the invention and not by way of limitation. Various modifications will readily occur to those skilled in the art, and the particular circuit configurations in the various functional elements or units of the system may be varied at will so long as the end function is retained. The appended claims are intended to cover any modifications of this nature falling within the true spirit and scope of the invention.

What we claim as new and desire to secure by Letters Patent of the United States is:

1. A frequency difference detector comprising a first gate circuit having an output only when a reference frequency signal occurs at a predetermined time interval during the cycle of an alternating current wave, a second gate circuit having an output only when the reference frequency signal next occurs at a time during said cycle lagging said predetermined time interval, a third gate circuit having an output only when the reference frequency signal next occurs at a time during said cycle leading said predetermined time interval, a pair of bistable circuits and interconnections with said gate circuits whereby the first bistable circuit cycles when the second gate circuit has an output and the second bistable circuit cycles when the third gate circuit has an output.

2. A frequency difference detector circuit comprising a first gate circuit responsive upon occurrence of a reference frequency signal during a predetermined time interval in the cycle of an alternating current wave, a second gate circuit responsive upon occurrence of said reference signal during a time interval in said cycle lagging said predetermined time interval, a third gate circuit responsive upon occurrence of said reference signal during a time interval in said cycle leading said predetermined time interval, a pair of bistable circuits, and means interconnecting said gate circuits with said bistable circuits to cause one bistable circuit to cycle in the event that the second gate circuit responds next after the first gate circuit and the other bistable circuit to cycle in the event that the third gate circuit responds next after the first gate circuit.

3. A frequency control system responsive to phase departure of an alternating current wave from a reference frequency signal, comprising a first gate circuit responsive upon occurrence of said reference signal during a predetermined time interval in the cycle of said alternating current wave, a second gate circuit responsive upon occurrence of said reference signal during a time interval in said cycle lagging said predetermined time interval, a third gate circuit responsive upon occurrence of said reference signal during a time interval in said cycle leading said predetermined time interval, a pair of bistable circuits, means interconnecting said gate circuits with said bistable circuits to cause one bistable circuit to cycle in the event that the second gate circuit responds next after the first gate circuit and the other bistable circuit to cycle in the event that the third gate circuit responds next after the first gate circuit, means responsive to the cycling of said bistable circuits and providing constant area pulses of one polarity upon cycling of one bistable circuit and of reverse polarity upon cycling of the other bistable circuit, and an integrating circuit providing an output according to the integral of said constant area pulses.

4. A frequency difference detector circuit responsive to phase departure of an alternating current wave from a reference frequency signal, comprising a first gate circuit responsive during coincidence of said reference signal with a predetermined time interval during the cycle of said alternating current wave, a second gate circuit responsive during coincidence of said reference signal with a discrete time interval in said cycle lagging said predetermined time interval, a third gate circuit responsive during coincidence of said reference signal with another discrete time interval in said wave leading said predetermined time interval, a pair of bistable circuits each having reset and set inputs, connections between said first gate circuit and the reset inputs of both bistable circuits, a connection between said second gate circuit and the set input of the first bistable circuit, a connection between said third gate circuit and the set input of the second bistable circuit, and the interconnections preventing the other bistable circuit from being set whenever one is already set.

5. A frequency control system responsive to phase departure of an alternating current wave from a reference frequency signal, comprising a first gate circuit responsive during coincidence of said reference signal with a predetermined time interval during the cycle of said alternating current wave, a second gate circuit responsive during coincidence of said reference signal with a discrete time interval in said cycle lagging said predetermined time interval, a third gate circuit responsive during coincidence of said reference signal with another discrete time interval in said wave leading said predetermined time interval, a pair of bistable circuits each having reset and set inputs, connections between said first gate circuit and the reset inputs of both bistable circuits, a connection between said second gate circuit and the set input of the first bistable circuit, a connection between said third gate circuit and the set input of the second bistable circuit, interconnections preventing the other bistable circuit from being set whenever one is already set whereby one bistable circuit cycles when the phase of said alternating current wave is advancing relative to said reference signal and the other bistable circuit cycles when the phase of said alternating current wave is regressing relative to said reference signal, and means responsive to the cycling of said bistable circuits for providing an integrated control signal.

6. A frequency control system responsive to phase departure of an alternating current wave from a reference frequency signal, comprising a first gate circuit responsive during coincidence of said reference signal with a predetermined time interval during the cycle of said alternating current wave, a second gate circuit responsive during coincidence of said reference signal with a discrete time interval in said cycle lagging said predetermined time interval, a third gate circuit responsive during coincidence of said reference signal with another discrete time interval in said wave leading said predetermined time interval, a pair of bistable circuits each having reset and set inputs, connections between said first gate circuit and the reset inputs of both bistable circuits, a connection between said second gate circuit and the set input of the first bistable circuit, a connection between said third gate circuit and the set input of the second bistable circuit, interconnections preventing the other bistable circuit from being set whenever one is already set, a differentiating circuit responsive to the cycling of said bistable circuits and providing constant area pulses of one polarity upon cycling of one bistable circuit and of reverse of polarity upon cycling of the other bistable circuit, and an integrating circuit including an amplifier with capacitive feedback receiving said constant area pulses and providing an output control signal dependent in kind upon the polarity of said constant area pulses and in amplitude upon the time integral of said constant area pulses.

7. A frequency difference detector circuit responsive to phase departure of an alternating current wave from a reference frequency occurring as pulses, comprising first, second and third gate circuits, means causing said first gate to transmit said pulses during coincidence thereof with a predetermined time interval in the cycle of said alternating current wave, means causing said second gate to transmit said pulses during coincidence thereof with a discrete time interval lagging said predetermined time interval, means causing said third gate to transmit said pulses during coincidence thereof with a discrete time interval leading said predetermined time interval, a pair of bistable multivibrators each having set and reset inputs, connections between said first gate and the reset inputs of both multivibrators, a connection between the second gate and the set input of one multivibrator, a connection between the third gate and the set input of the other multivibrator, a connection supplying a signal from said one multivibrator to block said third gate when set, and a connection supplying a signal from said other multivibrator to block said second gate when set, whereby said one multivibrator cycles for every phase gain of the alternating current wave over the reference frequency and said other multivibrator cycles for every phase loss of the alternating current wave relative to the reference frequency.

8. A frequency difference detector circuit responsive to phase departure of a three phase alternating current wave having component phases A, B, and C from a reference frequency in the form of pulses $f_R$, comprising gate circuits #1, #2 and #3, gate circuit #1 receiving as inputs A, C and $f_R$ and providing an output $A \cdot C \cdot f_R$, gate circuit #2 receiving as inputs A, B, $f_R$ and $FF_2$ as hereinafter defined and providing an output $A \cdot B \cdot f_R \cdot FF_2$, gate circuit #3 receiving as inputs B, C, $f_R$ and $FF_1$ as hereinafter defined and providing an output $B \cdot C \cdot f_R \cdot FF_1$, a pair of multivibrators #1 and #2 having reset and set states, multivibrator #1 having a connection to gate #1 whereby it is reset by the signal $A \cdot C \cdot f_R$ and a connection to gate #2 whereby it is set by the signal $A \cdot B \cdot f_R \cdot FF_2$, multivibrator #2 having a connection to gate #1 whereby it is reset by the signal $A \cdot C \cdot f_R$ and a connection to gate #3 whereby it is set by the signal $B \cdot C \cdot f_R \cdot FF_1$, a connection from multivibrator #1 to gate #3 supplying a signal $FF_1$ which allows gate #3 to provide an output only when multivibrator #1 is reset, and a connection from multivibrator #2 to gate #2 supplying a signal $FF_2$ which allows gate #2 to provide an output only when multivibrator #2 is reset, whereby multivibrator #1 cycles when the alternating current wave is advancing in phase relative to the reference frequency and multivibrator #2 cycles when the alternating current wave is regressing in phase relative to the reference frequency.

9. A frequency difference detector circuit as defined in claim 8 wherein each gate circuit comprises a transistor and biasing networks normally holding the transistor off unless all inputs thereto occur simultaneously in one polarity.

10. A frequency control system responsive to phase departure of a three phase alternating current wave having component phases A, B, and C from a reference frequency in the form of pulses $f_R$, comprising gate circuits #1, #2 and #3, gate circuit #1 receiving as inputs A, C and $f_R$ and providing an output $A \cdot C \cdot f_R$, gate circuit #2 receiving as inputs A, B, $f_R$ and $FF_2$ as hereinafter defined and providing an output $A \cdot B \cdot f_R \cdot FF_2$, gate circuit #3 receiving as inputs B, C, $f_R$ and $FF_1$ as hereinafter defined and providing an output $B \cdot C \cdot f_R \cdot FF_1$, a pair of multivibrators #1 and #2 having reset and set states, multivibrator #1 having a connection to gate #1 whereby it is reset by the signal $A \cdot C \cdot f_R$ and a connection to gate #2 whereby it is set by the signal $A \cdot B \cdot f_R \cdot FF_2$, multivibrator #2 having a connection to gate #1 whereby it is reset by the signal $A \cdot C \cdot f_R$ and a connection to gate #3 whereby it is set by the signal $B \cdot C \cdot f_R \cdot FF_1$, a connection from multivibrator #1 to gate #3 supplying a signal $FF_1$ which allows gate #3 to provide an output only when multivibrator #1 is reset, a connection from multivibrator #2 to gate #2 supplying a signal $FF_2$ which allows gate #2 to provide an output only when multivibrator #2 is reset, a differentiating circuit receiving signal $FF_1$ from multivibrator #1 and providing a constant area pulse $P_1$ in response thereto, and receiving signal $\overline{FF_2}$ being $FF_2$ inverted from multivibrator #2 and providing a constant area pulse $P_2$ of reverse polarity in response thereto, and an integrating circuit receiving said constant area pulses of both polarities and providing a control signal according to time integral thereof.

11. A frequency control system as defined in claim 10 and wherein said integrating circuit comprises a high gain A.-C. amplifier with synchronous A.-C. choppers at both input and output ends thereof, said constant area pulses being supplied to the input end chopper, and capacitive feedback from output to input end, said control signal being obtained at the output end chopper.

No references cited.